US009603025B2

(12) United States Patent
Charbit et al.

(10) Patent No.: US 9,603,025 B2
(45) Date of Patent: Mar. 21, 2017

(54) METHOD AND APPARATUS FOR SYNCHRONIZATION MECHANISMS ON UN-LICENSED BAND (75) Inventors: Gilles Charbit, Farnborough (GB); Na Wei, Beijing (CN); Wei Bai, Beijing (CN); Erlin Zeng, Beijing (CN)

(73) Assignee: BROADCOM CORPORATION, Irvine, CA (US)

( * ) Notice: Subject to any disclaimer, the term of this patent is extended or adjusted under 35 U.S.C. 154(b) by 289 days.

(21) Appl. No.: 14/355,929

(22) PCT Filed: Nov. 4, 2011

(86) PCT No.: PCT/CN2011/081833
§ 371 (c)(1),
(2), (4) Date: Jun. 26, 2014

(87) PCT Pub. No.: WO2013/063808
PCT Pub. Date: May 10, 2013

(65) Prior Publication Data
US 2014/0348094 A1    Nov. 27, 2014

(51) Int. Cl.
*H04W 16/14* (2009.01)
*H04W 56/00* (2009.01)
(Continued)

(52) U.S. Cl.
CPC ........... *H04W 16/14* (2013.01); *H04W 56/00* (2013.01); *H04W 56/001* (2013.01); *H04W 72/0413* (2013.01); *H04W 74/0808* (2013.01)

(58) Field of Classification Search
None
See application file for complete search history.

(56) References Cited

U.S. PATENT DOCUMENTS

2011/0256858 A1   10/2011  Wu
2012/0213105 A1*   8/2012  Wigren ..................... G01S 5/06
                                                              370/252
2012/0252432 A1*  10/2012  Henttonen ............ H04W 24/10
                                                              455/422.1

FOREIGN PATENT DOCUMENTS

CN           102036411         4/2011

OTHER PUBLICATIONS

3GPP TR 36.913 V8.0.1 (Mar. 2009) Technical Specification Group Radio Access Network; Requirements for Further Advancements for Evolved Universal Terrestrial Radio Access (E-UTRA) (LTE-Advanced) Release 8 (15 pages).

(Continued)

*Primary Examiner* — Andrew Lai
*Assistant Examiner* — Jamaal Henson
(74) *Attorney, Agent, or Firm* — Oblon, McClelland, Maier & Neustadt, L.L.P.

(57) ABSTRACT

A method for synchronizing channels on unlicensed bands is described. The method includes determining whether a SCC channel has started to be used by a first network. The SCC channel is a CA channel shared with at least one other network. In response to determining that the SCC channel has been started to be used by the first network, the UE determines an off duration describing a period since a previous SCC channel ON period. A given channel ON period is a continuous period of use of the given channel by the first network, The method also includes, in response to determining that the off duration is less than a minimum threshold duration, performing fine synchronization based on CRS tracking on the SCC channel using course synchronization parameters of the previous SCC channel ON period. Apparatus and computer readable media are also described.

20 Claims, 4 Drawing Sheets

(51) Int. Cl.
*H04W 72/04* (2009.01)
*H04W 74/08* (2009.01)

(56) References Cited

OTHER PUBLICATIONS

3GPP TR 36.913 V9.0.0 (Dec. 2009) Technical Specification Group Radio Access Network; Requirements for Further Advancements for Evolved Universal Terrestrial Radio Access (E-UTRA) (LTE-Advanced) Release 9 (15 pages).
3GPP TR 36.913 V10.0.0 (Mar. 2011) Technical Specification Group Radio Access Network; Requirements for Further Advancements for Evolved Universal Terrestrial Radio Access (E-UTRA) (LTE-Advanced) Release 10 (15 pages).

* cited by examiner

METHOD AND APPARATUS FOR SYNCHRONIZATION MECHANISMS ON UN-LICENSED BAND

TECHNICAL FIELD

The exemplary and non-limiting embodiments of this invention relate generally to wireless communication systems, methods, devices and computer programs and, more specifically, relate to synchronization using unlicensed bands.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
ADC analog to digital converter
ARFCN absolute radio frequency channel number
BCH broadcast channel
BS basestation
BW bandwidth
CA carrier aggregation
CC component carrier
CDM code division multiplexing
CE channel element
CRC cyclic redundancy check
CRS common reference signal
DCF distributed coordination function
DCI downlink control information
DIFS DCF inter-frame space
DL downlink (eNB towards UE)
DRX discontinuous reception
eNB enhanced Node B. Name for Node B in LTE
eNB E-UTRAN Node B (evolved Node B)
EPC evolved packet core
E-UTRAN evolved UTRAN (LTE)
FFT fast Fourier transform
FSVB fast synchronization verification block
GPS global positioning system
HARQ hybrid automatic repeat request
IMT-A international mobile telephony-advanced
ITU international telecommunication union
ITU-R ITU radiocommunication sector
LTE long term evolution of UTRAN (E-UTRAN)
LTE-A LTE advanced
MAC medium access control (layer 2, L2)
MIB master information block
MM/MME mobility management/mobility management entity
NACK not acknowledge/negative acknowledge
Node B base station
OFDM orthogonal frequency division multiplexing
OFDMA orthogonal frequency division multiple access
OS OFDM symbol
PS-SCH primary/secondary synchronization channel
P-BCH physical broadcast channel
PCC primary cell carrier
PCFICH physical control format indicator channel
PDCP packet data convergence protocol
PDSCH physical downlink shared channel
PHY physical (layer 1, L1)
PRB physical resource block
P-SCH primary synchronization channel
RF radio frequency
RLC radio link control
RRC radio resource control
RRH remote radio head
RRM radio resource management
S GW serving gateway
SC FDMA single carrier, frequency division multiple access
SCC secondary cell carrier
SCell secondary cell
SCH synchronization channel
SFN subframe number
SI system information
SIB system information block
SIB1 SIB type 1
SINR signal to interference and noise ratio
S-SCH secondary synchronization channel
TAE timing alignment error
TCC tracking component carrier
UE user equipment, such as a mobile station or mobile terminal
UL uplink (UE towards eNB)
UTRAN universal terrestrial radio access network
WLAN wireless local access network Of particular interest herein are the further releases of 3GPP LTE (e.g., LTE Rel-10) targeted towards future IMT-A systems, referred to herein for convenience simply as LTE-Advanced (LTE-A). Reference in this regard may be made to 3GPP TR 36.913, V8.0.1 (2009 03), 3rd Generation Partnership Project; Technical Specification Group Radio Access Network; Requirements for Further Advancements for E UTRA (LTE-Advanced) (Release 8). A goal of LTE-A is to provide significantly enhanced services by means of higher data rates and lower latency with reduced cost. LTE-A is directed toward extending and optimizing the 3GPP LTE Rel-8 radio access technologies to provide higher data rates at very low cost. LTE-A will most likely be part of LIE Rel-10. LTE-A will be a more optimized radio system fulfilling the ITU-R requirements for IMT-A while maintaining backward compatibility with LTE Rel-8. Reference is further made to a Release 9 version of 3GPP TR 36.913, V9.0.0 (2009-12). Reference is also made to a Release 10 version of 3GPP TR 36.913, V10.0.0 (2011-06).

As is specified in 3GPP TR 36.913, LTE-A should operate in spectrum allocations of different sizes, including wider spectrum allocations than those of Rel-8 LTE (e.g., up to 100 MHz) to achieve the peak data rate of 100 Mbit/s for high mobility and 1 Gbit/s for low mobility. It has been agreed that carrier aggregation is to be considered for LTE-A in order to support bandwidths larger than 20 MHz. Carrier aggregation (CA), where two or more component carriers (CCs) are aggregated, is considered for LTE-A in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation as in LTE Rel-8.

A LTE-A terminal with reception capability beyond 20 MHz can simultaneously receive transmissions on multiple component carriers. A LTE Rel-8 terminal can receive transmissions on a single component carrier only, provided that the structure of the component carrier follows the Rel-8 specifications. Moreover, it is required that LTE-A should be backwards compatible with Rel-8 LTE in the sense that a Rel-8 LTE terminal should be operable in the LTE-A system, and that a LTE-A terminal should be operable in a Rel-8 LTE system.

Figure 1:
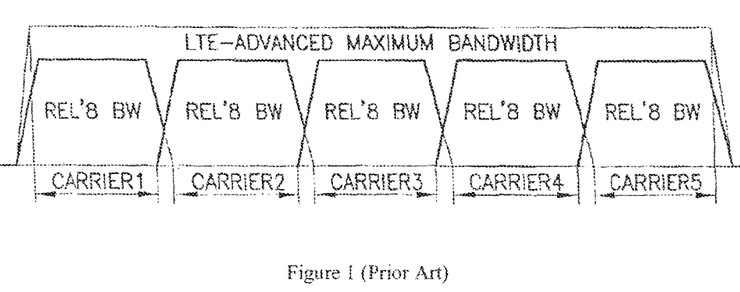
FIG. 1 shows an example of carrier aggregation as proposed for the LTE-A system.

FIG. 1 shows an example of the carrier aggregation, where M Rel-8 component carriers are combined together to form M×Rel-8 BW (e.g., 5×20 MHz=100 MHz given M=5). Rel-8 terminals receive/transmit on one component carrier, whereas LTE-A terminals may receive/transmit on multiple component carriers simultaneously to achieve higher throughputs through bandwidths.

With further regard to carrier aggregation, what is implied is that one eNB can effectively contain more than one cell on more than one CC (frequency carrier), and the eNB can utilize one (as in E-UTRAN Rel-8) or more cells (in an aggregated manner) when assigning resources and scheduling the UE.

Carrier Aggregation (CA) in LTE-Advanced extends the maximum bandwidth in the uplink (UL) or downlink (DL) directions by aggregating multiple carriers within a frequency band (intra-band CA) or across frequency bands (inter-band CA).

A primary cell carrier (PCC) using LTE technology may be configured on a LTE licensed band for primary access providing mobility, security and state management for user terminals while a secondary cell carrier (SCC) using another carrier (e.g., a carrier using WLAN technology) may be opportunistically configured/activated on an un-licensed band for secondary access to provide additional data plane transport.

Finding a free channel in an unlicensed band becomes more and more difficult, since there are many other systems that might utilize those frequencies. Potential co-existing systems may include: IEEE 802.11b/a/g/n/ac, Bluetooth, Zigbee, etc. In case the LTE system also wishes to utilize the unlicensed band, it may face the challenge of needing more agile spectrum sharing or time sharing in order to accommodate those systems. Thus, time/frequency synchronization should be carried out by the UE as quickly as possible.

When an LTE system is deployed in a licensed band, part of the downlink physical layer signaling transmission may be specified to be performed continuously, e.g., on the primary synchronization channels (P-SCH) and secondary synchronization channels (S-SCH) with a 5 ms periodicity on subframes #0 and #5. The master information block may be transmitted with a 40 ms periodicity at a single frame number (SFN) mod 4=0 in sub-frame #0 on the physical broadcast channel (P-BCH) in mid 6 physical resource blocks (PRB). In addition, a system information block Type 1 (SIB1) is transmitted with 80 ms periodicity at SFN mod 8=0 in sub-frame #5 on the physical downlink shared channel (PDSCH). All other SIBs may be transmitted periodically in system information messages in non-overlapping common-length time-domain system-information (SI) windows as configured in SIB1.

In one technique to deploy LTE system in a shared band without any modification, the LTE will occupy the spectrum all the time in order to transmit the synchronization channel, cell-specific reference signals, and system information. This may block any other system's usage, which unfairly monopolizes the channel and may raise problems with the regulatory requirements on unlicensed band. To co-exist with 802.11 systems, the LTE system may suspend all continuous transmission when a WiFi system is occupying the wireless medium on the shared spectrum and resume transmission when the wireless medium become available. The LTE system may rely on a combination of sensing WiFi activity and frequency/time sharing of the wireless medium to determine such ON-OFF transmission patterns. In contrast, turning off all eNB transmissions of the LTE system is different from a DRX concept in Rel-10 where the UE turns off reception, but the eNB still keeps on continuously transmitting.

The above technique may solve a co-existence problem between the LTE system and a WiFi system on a shared band but it may also raise another problem. The UE may lose synchronization in time and frequency since there are no continuous PS-SCH, MIB or CRS transmissions in the configured SCC. When using inter-band CA, new carrier types without PS-SCH, CRS or BCH cannot readily be considered due to the need for the UE to achieve initial synchronization and to track synchronization parameters on the configured SCC. The configured PCC cannot be used for such a purpose as the PCC and SCC are on different bands.

After the LTE eNB turns on the system again, the UE may need some time to perform a time-offset estimation and a frequency-offset estimation based on the PS-SCH. Then the UE will need to do a CRS-based channel estimation to detect a MIB on the PBCH and to perform a MIB CRC check to ensure there is no false SCH detection. The UE may then carry out timing and frequency correction before packets on the PDSCH can be received. The CRS may be used by a time and frequency synchronization tracker, referred to as a CRS tracker, to maintain synchronization. The MIB CRC check can add an average delay of 20 ms (e.g., due to 40 ms periodicity of MIB transmissions the maximum time to wait is 40 ms), while the minimum time could be within 1 ms where the UE detects the MIB is transmitted on the PS-SCH in subframe #0 at SFN mod 4=0. For cell-edge UEs, where the MIB CRC check may fail, the delay could be a multiple of 40 ms. Such delays are not acceptable especially if a typical ON-duration period may be of at least 30 ms (maximum WiFi packet size duration) and at most a few hundred ms assuming a reasonable WiFi load.

When multiple SCCs with small timing differences are configured on the DL, it may be possible to perform and maintain synchronization faster and more reliably using the multiple carriers forming a downlink synchronization group.

Figure 5:
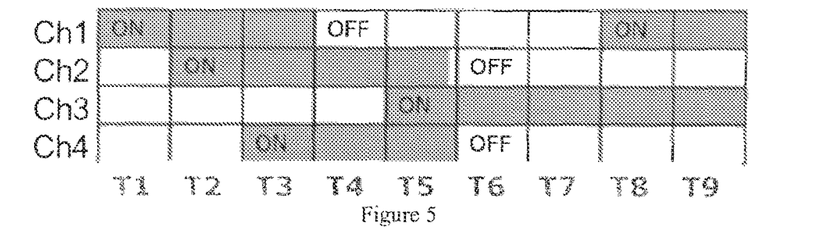
FIG. 5 illustrates a DL synchronization group using an unlicensed band.

A DL synchronization group may be configured via RRC/MAC signaling as part of the SCC configuration for UEs. The DL synchronization group may include carriers CH1, CH2, CH3 and CH4 is illustrated in FIG. 5. The synchronization aspects of an "always on" tracking carrier concept may be challenging for the UE to cope with a relative propagation delay difference of up to 31.3 μs among the component carriers to be aggregated in inter-band non-contiguous CA. In a non-repeater case, the timing offset due to the BS time alignment is specified to be up to 1.3 μs. The time alignment is also referred to as the Timing Alignment Error (TAB) (which may be defined such that when the eNB intends to make the Tx timing on different CC aligned, a 1.3 μs difference is allowed as the maximum error). In a repeater case, there may be an additional propagation delay difference of up to 30 μs among the component carriers (e.g., when there are repeaters/RRHs).

If no RRH/repeater is used, a 1.3 μs BS time alignment and, typically, a 0.52 μs delay (due to frequency separation) may be seen. Using a sample duration, Ts (as specified in LTE) of 55 samples per timing offset which is inherited from the CRS tracker on the other carriers CH2, CH2 and CH3 during the overlapping ON periods (CH2 on T2-T5, CH3 on T5-T9 and CH4 on T3-T5) during which the configured SCC is in an OFF period.

The residual timing offset for the CRS tracker on configured SCC may be corrected, e.g., CH1, at the beginning on its next ON period (CH1 on T8-T9). The UE cannot run the CRC tracker on the configured SCC during its OFF period since the eNB suspends all transmission. This is a difference from having the UE waking up early before the end of the quiet DRX period to re-acquire time and frequency synchronization form CRS (which may be continuously transmitted by the eNB) independently from a DRX configuration of the UEs via dedicated signaling.

Figure 6:
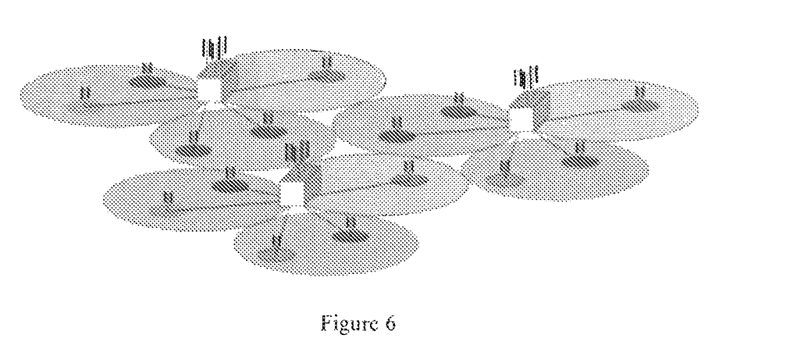
FIG. 6 demonstrates an example of a CA deployment scenario with a RRH.
Figure 7:
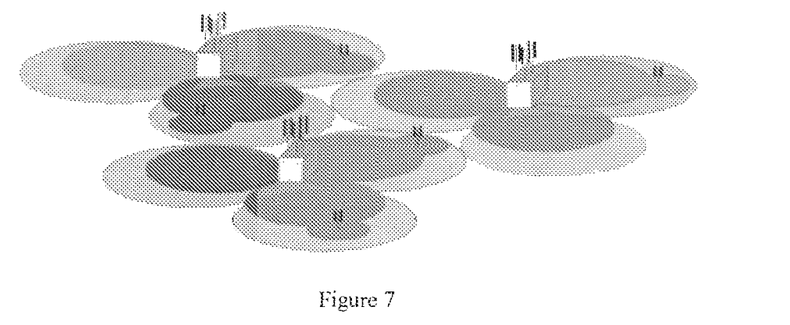
FIG. 7 demonstrates an example of a CA deployment scenarios with repeaters

The repeater case is illustrated in FIG. 6 and the RRH case is illustrated in FIG. 7 (F1 in light grey, F2 in dark grey, where the transmission range of F2 is less than that of F1). A larger timing offset will be inherited by the CRS tracker, exacerbating the described problem. In the repeater/RRH cases, the timing offset will be even larger, for example, 30 μs+1.3 μs giving a timing offset of 971 samples.

Such delay may pose a problem to maintaining synchronization with CRS tracker using CRS from other carriers. If the CRS tracker is a post-FFT detector, the FFT window processing may require good coarse time offset correction (e.g. with a residual timing offset of a few samples) and good frequency offset correction (e.g. within a few hundred Hz) which may be provided by a pre-FFT PS-SCH detector followed by post-FFT MIB CRC. However, this presents a logistical problem of having the pre-FFT PS-SCH detector following the post-FFT MIB CRC.

SUMMARY

The below summary section is intended to be merely exemplary and non-limiting.

The foregoing and other problems are overcome, and other advantages are realized, by the use of the exemplary embodiments of this invention.

In a first aspect thereof an exemplary embodiment of this invention provides a method for synchronizing channels on unlicensed bands. The method includes determining, by a user equipment, whether a SCC channel has started to be used by a first network. The SCC channel is a carrier aggregation channel shared with at least one other network. In response to determining that the SCC channel has been started to be used by the first network, the user equipment determines an off duration, $T_{off}$, describing a period since a previous SCC channel ON period. A given channel ON period is a continuous period of use of the given channel by the first network. The method also includes, in response to determining that the off duration is less than a minimum threshold duration, $T_{min}$, performing, by the user equipment, fine synchronization based on CRS tracking on the SCC channel using course synchronization parameters of the previous SCC channel ON period.

In another aspect thereof an exemplary embodiment of this invention provides an apparatus for synchronizing channels on unlicensed bands. The apparatus includes a processor; and a memory including computer program code. The memory and the computer program code are configured to, with the processor, cause the apparatus to perform actions. The actions include determining whether a SCC channel has started to be used by a first network. The SCC channel is a carrier aggregation channel shared with at least one other network. In response to determining that the SCC channel has been started to be used by the first network, an off duration, $T_{off}$, is determined describing a period since a previous SCC channel ON period. A given channel ON period is a continuous period of use of the given channel by the first network. The actions also include, in response to determining that the off duration is less than a minimum threshold duration, $T_{min}$, performing fine synchronization based on CRS tracking on the SCC channel using course synchronization parameters of the previous SCC channel ON period.

In another aspect thereof an exemplary embodiment of this invention provides an computer readable medium for synchronizing channels on unlicensed bands. The computer readable medium is tangibly encoded with a computer program executable by a processor to perform actions. The actions include determining whether a SCC channel has started to be used by a first network. The SCC channel is a carrier aggregation channel shared with at least one other network. In response to determining that the SCC channel has been started to be used by the first network, an off duration, $T_{off}$, is determined describing a period since a previous SCC channel ON period. A given channel ON period is a continuous period of use of the given channel by the first network. The actions also include, in response to determining that the off duration is less than a minimum threshold duration, $T_{min}$, performing fine synchronization based on CRS tracking on the SCC channel using course synchronization parameters of the previous SCC channel ON period.

In another aspect thereof an exemplary embodiment of this invention provides an apparatus for synchronizing channels on unlicensed bands. The apparatus includes means for determining whether a SCC channel has started to be used by a first network. The SCC channel is a carrier aggregation channel shared with at least one other network. The apparatus also includes means for determining an off duration, $T_{off}$, describing a period since a previous SCC channel ON period in response to determining that the SCC channel has been started to be used by the first network. A given channel ON period is a continuous period of use of the given channel by the first network. The method also includes, in response to determining that the off duration is less than a minimum threshold duration, $T_{min}$, means for performing fine synchronization based on CRS tracking on the SCC channel using course synchronization parameters of the previous SCC channel ON period.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Various exemplary embodiments in accordance with this invention provide synchronization of an LTE system deployment using an unlicensed band while another system is deployed and using that same band. The LTE system may use inter-band carrier aggregation with a licensed band carrier as well as an unlicensed band carrier.

Various exemplary embodiments in accordance with this invention enable the UE to maintain the PS-SCH based coarse synchronization on other carriers in a new cell DL synchronization group during overlapping ON periods in order to account for a larger timing offset due to movements of the UE and on a configured SCC at the beginning of the next ON period in order to account for a residual timing offset due to a carrier timing difference. Accordingly, such embodiments improve coarse synchronization performance and reduce complexity of a PS-SCH detector.

The UE can perform synchronization by using a fast synchronization verification block (FSVB) CRC following PS-SCH detection. This synchronization would be faster than would be possible if MIB CRC were used.

The UE can decode the MAC control element in the FSVB signaling payload to get fast and reliable implicit activation/de-activation of SCCs on the unlicensed band that was pre-configured by the RRC MAC configuration information element. The RRC MAC configuration information element may be transmitted via dedicated RRC signaling on the PCC on the licensed band. This allows fast and flexible time sharing with other systems since the overhead for re-synchronizing in frequency and time is made low. Thus, enabling better spectrum utilization for the LTE system as well as for the co-existing systems.

The PS-SCH, MIB, other system info, and the FSVB may be transmitted in the mid 6 PRBs. Since the FSVB overhead is small (e.g. comparable to PS-SCH overhead), the various exemplary embodiments are very efficient while allowing all considered scenarios, e.g., UE velocity, large OFF period, HetNet deployments with repeaters/RRHs, etc.

Figure 2:
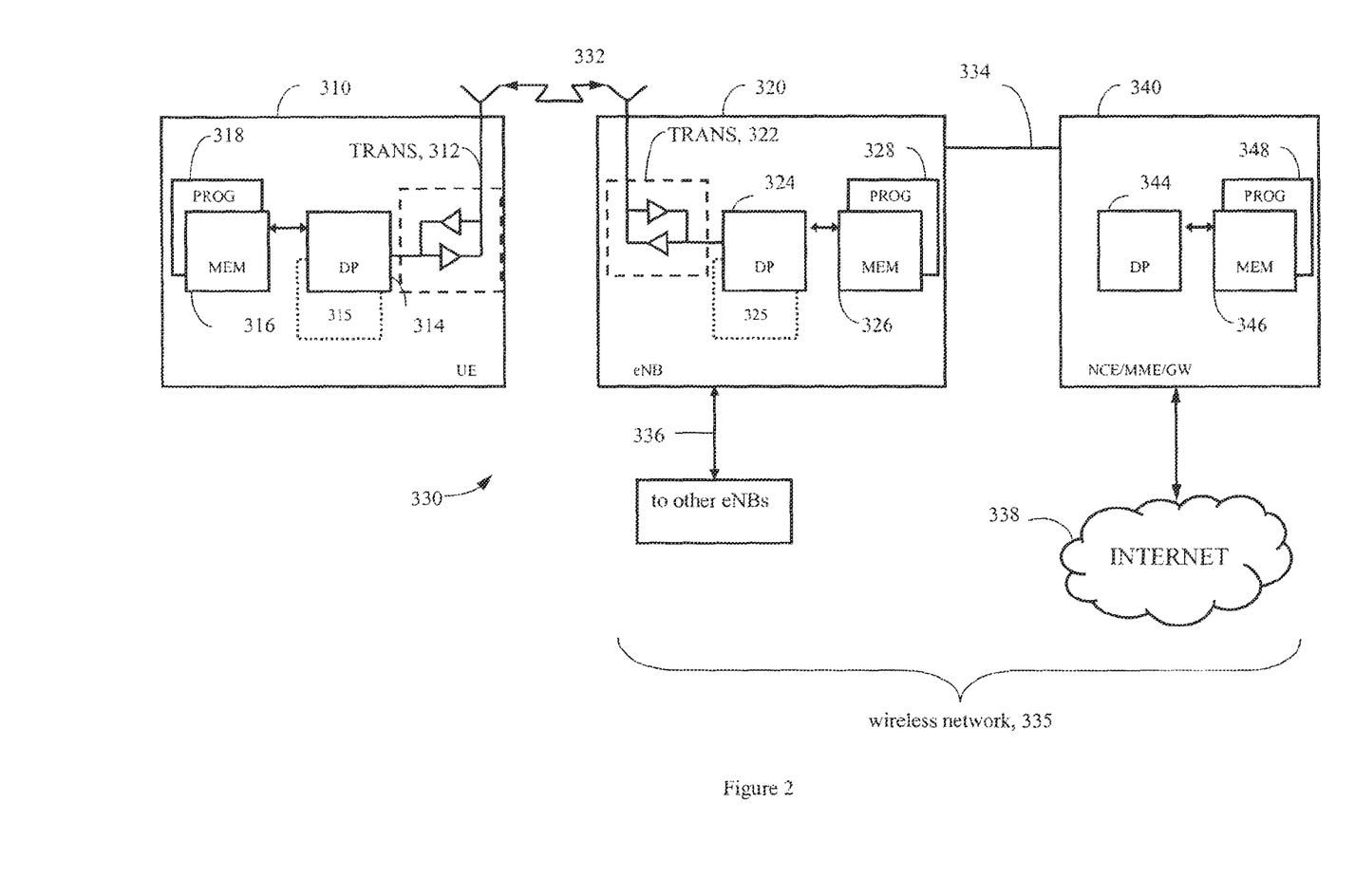
FIG. 2 shows a simplified block diagram of exemplary electronic devices that are suitable for use in practicing various exemplary embodiments of this invention.

Before describing in further detail various exemplary embodiments of this invention, reference is made to FIG. 2 for illustrating a simplified block diagram of various electronic devices and apparatus that are suitable for use in practicing exemplary embodiments of this invention.

In the wireless system 330 of FIG. 2, a wireless network 335 is adapted for communication over a wireless link 332 with an apparatus, such as a mobile communication device which may be referred to as a UE 310, via a network access node, such as a Node B (base station), and more specifically an eNB 320. The network 335 may include a network control element (NCE) 340 that may include the MME/SGW functionality, and which provides connectivity with a network, such as a telephone network and/or a data communications network (e.g., the internet 338).

The UE 310 includes a controller, such as a computer or a data processor (DP) 314, a computer-readable memory medium embodied as a memory (MEM) 316 that stores a program of computer instructions (PROG) 318, and a suitable wireless interface, such as radio frequency (RF) transceiver 312, for bidirectional wireless communications with the eNB 320 via one or more antennas.

The eNB 320 also includes a controller, such as a computer or a data processor (DP) 324, a computer-readable memory medium embodied as a memory (MEM) 326 that stores a program of computer instructions (PROG) 328, and a suitable wireless interface, such as RF transceiver 322, for communication with the UE 310 via one or more antennas. The eNB 320 is coupled via a data/control path 334 to the NCE 340. The path 334 may be implemented as an S1 interface. The eNB 320 may also be coupled to another eNB via data/control path 336, which may be implemented as a X2 interface.

The NCE 340 includes a controller, such as a computer or a data processor (DP) 344, a computer-readable memory medium embodied as a memory (MEM) 346 that stores a program of computer instructions (PROG) 348.

At least one of the PROGs 318, 328 and 348 is assumed to include program instructions that, when executed by the associated DP, enable the device to operate in accordance with exemplary embodiments of this invention, as will be discussed below in greater detail.

That is, various exemplary embodiments of this invention may be implemented at least in part by computer software executable by the DP 314 of the UE 310; by the DP 324 of the eNB 320; and/or by the DP 344 of the NCE 340, or by hardware, or by a combination of software and hardware (and firmware).

The UE 310 and the eNB 320 may also include dedicated processors, for example synchronization unit 315 and synchronization unit 325.

In general, the various embodiments of the UE 310 can include, but are not limited to, cellular telephones, tablets having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 316, 326 and 346 may be of any type suitable to the local technical environment and may be implemented using any suitable data storage technology, such as semiconductor based memory devices, flash memory, magnetic memory devices and systems, optical memory devices and systems, fixed memory and removable memory. The DPs 314, 324 and 344 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 312 and 322) may be of any type suitable to the local technical environment and may be implemented using any suitable communication technology such as individual transmitters, receivers, transceivers or a combination of such components.

Cell DL Synchronization Group

A RRC DL synchronization group configuration message for LTE deployment on unlicensed band may include carriers configured for direct transmission between the eNB and the UE and carriers configured for transmission between the eNB and the UE via repeaters/RRHs. The RRC configuration message (e.g., pseudo-static ON-OFF pattern configuration) or MAC control elements (e.g., for faster ON-OFF pattern configuration) may be transmitted on the PCC (e.g., the licensed band) and may include an ON-OFF pattern based on the SFN; an absolute radio frequency channel numbers (ARFCN) of DL carriers and a bitmap, B1, indicating the priority type/list of the CCs configuration (e.g., those in a given synchronization group, PS-SCH, MIB, and FSVB) for the DL carriers.

In case there is an overlapping ON period, the UE may attempt PS-SCH detection of only the carriers in the DL synchronization group which transmit the PS-SCH and MIB. This optimizes power and synchronization performance, as it avoids blind PS-SCH detection in case the PS-SCH and/or MIB not transmitted on new carrier types.

In case the bitmap B1 indicates a lower priority for a given CC #m in a given synchronization group, the UE may prioritize the use of CCs other than CC #m for synchronization purpose. These carriers may have smaller relative timing offsets due to a BS time alignment of 1.3 µs compared to carriers with repeaters/RRHs which may have additional propagation delay differences of up to 30 µs.

An exemplary LTE synchronization procedure on the unlicensed band is described. On entering an OFF period on the configured SCC, the UE may perform CRS-tracking on the configured SCC only if the UE velocity is low and the OFF duration, $T_{off}$, is less than a threshold, e.g., $T_{max}$. Therefore, the UE may assume the synchronization parameters are still valid in next ON period. Alternatively, the UE may perform SCH detection on other carriers in the cell DL synchronization group and on the configured SCC.

Fast Synchronization Verification Block

The Fast Synchronization Verification Block (FSVB) may be transmitted on the Physical Broadcast Channel (P-BCH) with a periodicity matching that of the PS-SCH. This will reduce latency significantly and may assist a UE on the cell-edge suffering high interference/path loss where the MIB CRC may fail. Coarse synchronization is based on PS-SCH detection and may take on average 20 ms as it needs the MIB CRC check to reduce false synchronization detection (the MIB periodicity is 40 ms). Accordingly, the FSVB provides less latency than waiting for the MIB CRC.

The master information block (MIB) is transmitted on the P-BCH with a 40 ms periodicity and other system information blocks are transmitted on the PDSCH. With the FSVB, there are at least two cases that improve system efficiency. In the first case, the MIB and FSVB will both be transmitted on the P-BCH to allow the standalone LTE system to use the unlicensed band. Non-CA UEs may use MIB (and other system information messages) to configure their RRC parameters and then use the FSVB for fast synchronization at the beginning of each ON duration period.

In the second case, only the FSVB is transmitted on the P-BCH (e.g., no MIB or other system information messages) to CA-capable UEs. These UEs can get the MIB and other system information on the PCC on the licensed spectrum.

The periodicity or presence of FSVB for a given SCell can be predefined or configured via higher layer signaling transmitted in PCell.

The FSVB may also be conveyed by a predefined or higher layer configured PDSCH. In this case, the PDSCH may have a CRC filed which is based on a UE ID or a predefined group UE ID, and thus can be utilized for fast verification. The eNB may be configured via a higher layer than the PDSCH for a UE or a group of UEs based on need, e.g., the ON/OFF pattern of a given SCell in a synchronization group. If ACK/NACK information corresponding to the PDSCH is available at the eNB side, such information can serve as a confirmation of fast verification, which may help the eNB's scheduling of the UEs on the SCell when it is turned on.

L1/MAC Control Element on the FSVB

The FSVB may include an L1/MAC control element for fast SCell activation/de-activation on some or all the SCells. These SCells may be those that were pre-configured on carriers in the cell DL synchronization group via RRC MAC configuration information element. The FSVB may also be sent with CRC bits to check (i) that the PS-SCH detection is not erroneous and (ii) that the signaling payload decoding has been successful. The FSVB may be transmitted on the P-BCH as the L1/MAC CE is broadcasted to all the UEs allowed on the SCell on un-licensed band. The FSVB may be mapped to subframes #0 and #5 containing the PS-SCH (excluding subframe #0 at SFN mod 4=0 which may be used for transmitting the MIB).

The FSVB and MIB may be attached to separate BCH transport blocks before mapping to separate physical resources on the P-BCH. This avoids multiplexing of the FSVB and MIB on the same BCH transport block. The FSVB may be transmitted only at the beginning of an ON duration period or throughout the ON duration period.

The L1/MAC control element may be changed at the beginning of each ON duration period on the pre-configured SCCs independently from the BCCH modification period. The BCCH modification period may be long enough to include many ON-OFF periods. Thus, this message may be referred to as a MAC control element rather than an RRC system information message.

As an alternative to having the SCC use WLAN technology, the SCC may instead use LTE technology. This would have the benefit of simplifying the UE terminal implementation (e.g., no tight integration between the LTE and WLAN protocol stacks needed).

Figure 3:
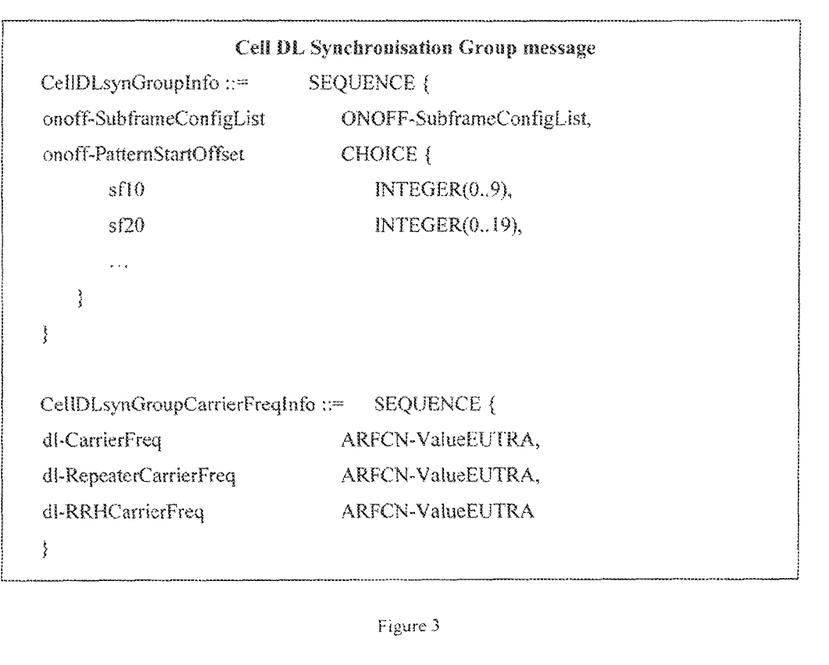
FIG. 3 is an example of a RRC MAC configuration information element containing information regarding a Cell DL Synchronization Group message in accordance with various exemplary embodiments of this invention.
Figure 4:
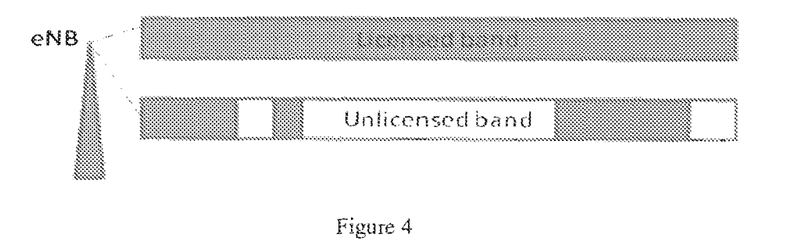
FIG. 4 illustrates a LTE inter-band carrier aggregation deployment using an unlicensed band.

RRC Pre-Configuration of SCCS on Carriers in Cell DL Synchronization Group and Fast Activation Via L1/MAC CE The eNB may send RRC MAC configuration information element to UEs via dedicated RRC signaling. This signaling may contain information of the cell DL synchronization group setup (e.g., an ON-OFF pattern, DL carriers types, etc.) as illustrated in FIG. 3. This information may be added inside SCell configuration RRC signaling in order to indicate changes in the ON-OFF pattern and carrier configuration within the cell DL synchronization group. For example, the ON-OFF pattern may be varied to increase/decrease the OFF duration or ON duration in response to sensing a WiFi system on some of the carriers. In another example, the signaling transmitted by the carriers may be changed, e.g., carriers may not transmit the PS-SCH or MIB anymore due to interference from WiFi systems or a new verification signal may be transmitted to allow faster synchronization in case of relatively short ON durations.

Table 1 describes some of the elements of the Cell DL Synchronization Group message shown in FIG. 3.

TABLE 1

Cell DL Synchronization Group message field descriptions onoff-SubframeConfigList Defines the blocks of K consecutive subframes $S_0S_1S_2S_3 \ldots S_M$ that are marked as ON duration (Si = 1) or OFF duration (Si = 0) with M = b1, b2, . . . , b64 consecutive blocks of k = 30 subframes
for UE access to channels on un-licensed bands for DL carriers F1, F2, . . . , Fn onoff-PatternStartOffset Start of ON-OFF pattern is systemFrameNumber offset by sfx subframes. Value sf10 corresponds to 10 subframes, sf20 corresponds to 20 subframes CellDLsynGroupCarrierFreqInfo List of DL carriers in cell DL synchronization group.

The L1/MAC control elements on the FSVB may be used to activate the SCell on the un-licensed band once they have been pre-configured via MAC configuration information element. The L1/MAC CE of the FSVB may be transmitted on the P-BCH similarly to the MIB, e.g., using CRC attachment, channel convolutional coding, and rate matching mechanisms. The 16-bit CRC of the FSVB may be scrambled according to the eNB transmit antenna configuration with the same sequence used for the MIB CRC scrambling. One difference being that the FSVB and MIB are attached to separate BCH transport blocks and mapped to separate physical resources and hence no multiplexing of the two blocks on the same physical resources. Alternatively, a new CRC, channel coding, rate matching and CRC scrambling may be used in a compatible way with the DL transport channel BCH.

Fast Synchronization Verification Block (FSVB)

Shared channel (SCH) design in current LTE systems uses an always-on SCH/BCH as a compromise between overhead and performance. In an unlicensed band, the always-on assumption cannot be made. The MIB periodicity of 40 ms means that using a SCH/MIB for coarse timing estimation can take on average 20 ms, and may be a multiple of 40 ms when MIB detection fails due to interference and path loss (e.g., as may be experienced by cell-edge UEs). A verification signal may be sent with a 5 ms periodicity instead of the MIB (which is an inefficient way to repeat the MIB since the MIB requires relatively many bits). This allows coarse timing acquisition based on the PSCH and verification signal CRC check to be done within 5 ms.

The P-SCH and the S-SCH may be mapped to OFDM symbols (OS)/subframes in mid-6 PRBs on the un-licensed band. For example, the P-SCH may be transmitted in the last OS in subframes #0 and #5. The S-SCH may then be transmitted in the second to last OS in subframes #0 and #5. The FSVB could be mapped to one OS or up to 3 OS in the third, fourth and/or fifth from last OS in subframes #0 and #5 in the mid 6 PRBs.

This provides various options: (i) the FSVB may be transmitted only in the first N subframes containing the PS-SCH to improve signal efficiency in case the UEs are only activating the SCell at the beginning a the relatively small ON duration period; and (ii) the FSVB is transmitted throughout the ON duration in the subframes containing the PS-SCH in order to improve fast traffic offloading to the SCell on the unlicensed band in case the UEs are activating the SCell after the beginning of a relatively large ON duration period.

The FSVB may be transmitted on the physical broadcast channel (P-BCH) with a periodicity matching that of the PS-SCH. For example, the FSVB may be transmitted in a subframe containing the P-SCH and the S-SCH. The MIB may also be transmitted on the P-BCH with periodicity 40 ms in subframe #0 at SFN mod 4=0.

The FSVB and MIB may be transmitted in separate transport blocks, e.g., no FSVB is transmitted in subframe 140 at SFN mod 4=0. This restriction simplifies the implementation as it removes the need for de-multiplexing the MIB and the FSVB in case they were transmitted on the same transport block. As the MIB is transmitted once every 40 subframes, this restriction is not significant as the FSVB can be transmitted in the other 39 subframes that do not include the MIB.

In the unlicensed band, since legacy terminals may not be supported the PS-SCH and the FSVB periodicity may be higher than 5 ms for standalone LTE system. These signals could be transmitted at every subframe for the first N subframes at the beginning of the ON duration period in order to allow even faster synchronization by the UEs.

Another possibility is to carry the FSVB via some predefined or higher layer configured PDSCH resources. Any physical channel containing an encoded payload with a CRC (e.g., a predefined PDSCH indicated on a PCC on the licensed band) or a known block code (e.g., a control format indicator encoded with a $\frac{1}{16}$ code rate block code and mapped to a PCFICH) may be used. The FSVB can re-use the same mapping/encoding as the MIB as it may be mapped to the PBCH in mid 6 PRBs (providing efficient UE power consumption/processing). The FSVB can be used to determine the eNB transmit antenna configuration (e.g., using L1 control signaling detection).

A standalone LTE system (e.g., with no PCC on the licensed band) may use a (high-frequency, small) FSVB signal for fast synchronization to increase robustness of the system as the sooner the verification can be performed the better. A difference between using a FSVB mapped to the PBCH or using a PDSCH is the use of the ACK as a confirmation of synchronization. One benefit is that the eNB will know earlier that a UE cannot be scheduled. Typically, the PDSCH detection will fail before L1 control signaling especially for robust PS-SCH and MIB. The eNB can improve the reliability of the PDSCH by increasing the resources (thus lower coding rate and lower operation point), as the PDSCH resources can be configurable via higher layer to provide flexibility.

LTE Synchronization Procedure on Unlicensed Band

The synchronization procedure on an unlicensed band may be performed by first, when the UE is configured on the SCC CH1 which has OFF period, $T_{off}$ less than a minimum limit $T_{min}$, the UE uses prior synchronization parameters.

Since $T_{off}$ is sufficiently short, the UE can assume that the time/frequency synchronization parameters have not changed are still valid. Thus, the UE can resumes CRS-tracking for fine synchronization tuning on the configured SCC CH1 at beginning of the next ON period from where it was stopped when entering the OFF period.

Secondly, when $T_{off}$ is greater than $T_{min}$ but less than a maximum limit, $T_{max}$, the UE resets the CRS-tracker to the initial state and resumes CRS tracking on the configured SCC CH1 at beginning of the next ON period using the prior time/frequency synchronization parameters. The tracking algorithm will rapidly converge when all CRS in the system BW are used and no significant performance loss is experienced.

Lastly, when $T_{off}$ is greater than $T_{max}$, the UE can assume that the time/frequency synchronization parameters are no longer valid and performs coarse synchronization on the carriers in the DL synchronization group (e.g., CH2, CH3 and CH4). This may be done in overlapping ON periods to account for the UE movements. The time-frequency synchronization correction may be based on the estimated timing offset and frequency offset of the carrier with a best SINR as determined by the PS-SCH correlator output or based on an average across the carriers.

If there are no overlapping ON periods for any of the carriers in the DL synchronization, the UE may first perform PS-SCH based coarse synchronization on the SCC CH1 at the beginning of the next ON period using a large PS-SCH detector window. This may increase processing/power requirements in the UE and result in higher PS-SCH detection failure due to erroneous detection peak as determined by MIB CRC check failure. The PS-SCH based coarse synchronization may be followed by CRS-based fine sync on the SCC CH1.

Next, after coarse synchronization when $T_{off}$ is greater than $T_{max}$, the UE can assume that the coarse synchronization from at least one of the carrier in DL sync group (e.g., CH2, CH3, CH4) during the overlapping ON period is not sufficiently accurate. In which case, the UE performs another coarse synchronization on the configured SCC CH1 in the next ON period to account for any inter-carrier delay difference with a relatively small PS-SCH detector window (e.g., when a larger delay difference due to UE movement is already corrected by using a large PS-SCH detector window).

After the second coarse synchronization, the UE starts a fine synchronization (e.g., synchronization with CRS-based tracking) on the configured SCC such as performed when $T_{off}$ is greater than $T_{min}$ but less than a maximum limit, $T_{max}$.

The boundaries limits for an OFF duration ($T_{min}$ and $T_{max}$) may be specified by RRC signaling or other signaling. Such information may be provided using a RRC MAC configuration information element signaled via dedicated RRC signaling, a MAC control element carried in the FSVB, and/or a FSVB mapping to a P-BCH. Alternatively, these limits may have default values.

Table 2 shows values for timing offset (D) that may be has when the synchronization is done on the configured SCC (e.g., not on the other carriers in the cell synchronization group during the overlapping ON durations). $T_{off}$ is the OFF duration, v is the UE velocity and d is the distance moved by UE during the OFF duration. D is timing offset due to the UE movement during the OFF duration and is measured in samples. Using the following formulas: velocity=distance/time, $v=d/T_{off}$, and c=d/D where the speed of light, c, is 3.108 m/s. The LTE sampling period Ts=1/(32.78*106) is used to convert the timing offset D in samples.

TABLE 2

| $t_{off}$ [ms] | 30 | | | 100 | | | 200 | | |
|---|---|---|---|---|---|---|---|---|---|
| v [km] | 3 | 30 | 100 | 3 | 30 | 100 | 3 | 30 | 100 |
| d [m] | 0.025 | 0.25 | 0.83 | 0.083 | 0.83 | 2.71 | 0.166 | 1.66 | 5.46 |
| D [samples] | 2.5 | 25 | 83 | 8.25 | 82.5 | 272 | 16.5 | 165 | 544 |

For the CRS tracker, the residual timing delay is preferred to be no more than a few samples. Depending on the OFF period and the UE speed, the SCH on the other carriers (due to the UE movement) and/or the SCH on the configured SCC may be used to bring the timing offset to a few samples at the beginning of the next ON period before the CRS tracking is performed.

Using post-FFT CRS tracking, the configured SCC could apply to low velocity UEs (e.g., velocities of less than 3 km/h) for a minimum OFF duration of 30 ms. Thus, SCH detection can be avoided. Even a residual timing offset of 2-3 samples should not impact the CRS tracker performance significantly.

A larger OFF duration of up to 100 ms at the same velocity (3 km/h) may be handled when the CRS tracker performance is not significantly degraded by a residual timing offset of 8 samples or about 0.24 μs (i.e., a fraction of the normal cyclic prefix of 4 μs) which results in an offset FFT processing window and some inter-subcarrier interference in OFDM signal.

For a UE with a velocity higher than 3 km/h or an OFF duration greater than 100 ins, the CRS tracker performance may suffer when only a configured SCC is used. In such cases, the other carriers (e.g., CH2, CH3, CH4) in the cell synchronization group during the overlapping ON durations (e.g., CH2 on T2-T5, CH3 on T5-T9, CH4 on T3-T5 on FIG. 5) may be used for synchronization purposes. When no RRH/repeater is used, an additional 55 samples timing offset may occur due to the 1.3 μs BS time alignment and 2.5 vs delay due to frequency separation. Web repeaters/RRHs are used, an even larger timing offset of 971 samples may occur because of an additional propagation delay difference of up to 30 μs. In such cases, the SCH on a configured SCH at beginning of next ON duration may be used for course synchronization as described above. The course synchronization may also use SCH of other carriers during the overlapping ON period.

PS-SCH Detector

A single detector may be used to detect the PS-SCH of all the DL carriers as long as the same RF front end (e.g., the same ADC) can be used.

A RRHs/repeater typically is used transparently to the UEs. Knowledge of carriers using repeaters/RRHs as signaled via RRC MAC configuration information element can help the PS-SCH detector. When the UE is moving, the timing offset due to repeaters/RRHs cannot be assumed to be constant. However, the UE may use a previous estimated timing offset by making some assumption on the sliding PS-SCH detector window. These assumptions help reduce the number of shifts to save UE processing/power consumption.

If a previous coarse timing offset is used (e.g., when $T_{off}$ is less than $T_{max}$) then only tracking may be needed. When $T_{off}$ is greater than $T_{max}$ coarse timing from other carriers may be used before performing coarse timing on the serving SCC. The sliding correlator parameters for coarse synchronization on other carriers in a cell DL synchronization group during the previous overlapping ON periods may be adjusted.

Based on the foregoing it should be apparent that the exemplary embodiments of this invention provide a method, apparatus and computer program(s) to provide a synchronization mechanism for channels on unlicensed bands.

Figure 8:
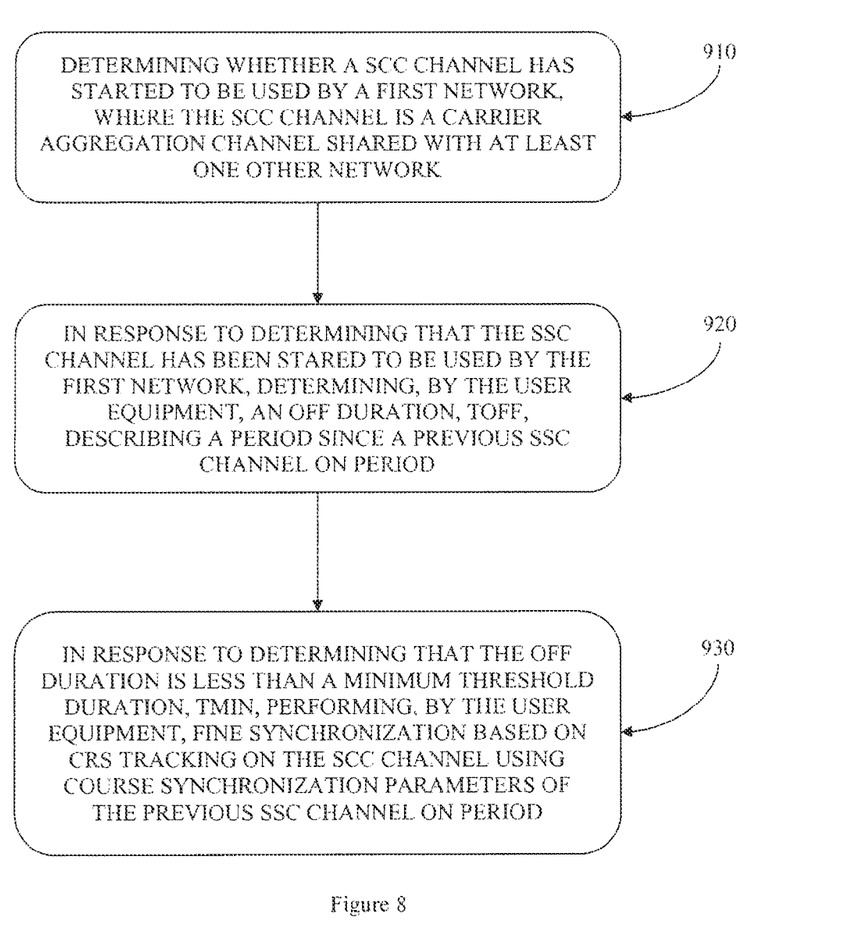
FIG. 8 is a logic flow diagram that illustrates the operation of an exemplary method, and a result of execution of computer program instructions embodied on a computer readable memory, in accordance with various exemplary embodiments of this invention.

FIG. 8 is a logic flow diagram that illustrates the operation of a method, and a result of execution of computer program instructions, in accordance with the exemplary embodiments of this invention. In accordance with these exemplary embodiments a method performs, at Block 910, a step of determining whether a SCC channel has started to be used by a first network. The SCC channel is a carrier aggregation channel shared with at least one other network. In response to determining that the SCC channel has been started to be used by the first network, the method performs, at Block 920, determining an off duration, $T_{off}$, describing a period since a previous SCC channel ON period. A given channel ON period is a continuous period of use of the given channel by the first network. In response to determining that the off duration is less than a minimum threshold duration, $T_{min}$, the method performs, at Block 930, performing fine synchronization based on CRS tracking on the SCC channel using course synchronization parameters of the previous SCC channel ON period.

The various blocks shown in FIG. 8 may be viewed as method steps, and/or as operations that result from operation of computer program code, and/or as a plurality of coupled logic circuit elements constructed to carry out the associated function(s).

An exemplary embodiment in accordance with this invention provides a method for synchronizing channels on unlicensed bands. The method includes determining, by a user equipment, whether a SCC channel has started to be used by a first network. The SCC channel is a carrier aggregation channel shared with at least one other network. In response to determining that the SCC channel has been started to be used by the first network, the user equipment determines an off duration, $T_{off}$, describing a period since a previous SCC channel ON period. A given channel ON period is a continuous period of use of the given channel by the first network. The method also includes, in response to determining that the off duration is less than a minimum threshold duration, $T_{min}$) performing, by the user equipment, fine synchronization based on CRS tracking on the SCC channel using course synchronization parameters of the previous SCC channel ON period.

In a further exemplary embodiment of the method above, the method includes, in response to determining that the off duration is less than the minimum threshold duration and that the off duration is greater than a maximum threshold duration, $T_{max}$, performing, by the user equipment, fine synchronization based on CRS tracking on the SCC channel using the course synchronization parameters of the previous SCC channel ON period as modified by re-initialized CRS tracking parameters.

In an additional exemplary embodiment of any one of the methods above, the method includes, in response to determining that the off duration is greater than a maximum threshold duration, $T_{max}$, performing, by the user equipment, a course synchronization based on PS-SCH detection on at least two channels having overlapping ON periods. The overlapping ON periods are periods when the at least two channels are simultaneously used by the first network and the at least two channels are shared with the at least one other network. The at least two channels may be members in a downlink synchronization group. The method may also include receiving, at the user equipment, an indication of a downlink synchronization group via RRC signaling from the first network. The RRC signaling may include a fast synchronization verification block.

In a further exemplary embodiment of any one of the methods above, the method includes, in response to determining that the off duration is greater than the maximum threshold duration and that there are no overlapping ON periods, performing, by the user equipment, a course synchronization based on PS-SCH detection on the SCC channel using a large detection window.

In an additional exemplary embodiment of any one of the methods above, the course synchronization based on PS-SCH detection on the SCC channel using a large detector window is a first course synchronization. The method also includes, in a subsequent SCC channel ON period, performing, by the user equipment, a second course synchronization based on PS-SCH detection on the SCC channel using a small detection window.

In a further exemplary embodiment of any one of the methods above, the method includes, in response to the course synchronization providing new course synchronization parameters, performing, by the user equipment, fine synchronization based on CRS tracking on the SCC channel using the new course synchronization parameters.

In an additional exemplary embodiment of any one of the methods above, the SCC channel is a channel on an unlicensed band for the first network.

A further embodiment in accordance with this invention provides an apparatus for synchronizing channels on unlicensed bands. The apparatus includes a processor; and a memory including computer program code. The memory and the computer program code are configured to, with the processor, cause the apparatus to perform any one of the methods above.

In an additional exemplary embodiment of the apparatus above, the apparatus is embodied in an integrated circuit.

In a further exemplary embodiment of the apparatus above, the apparatus is embodied in a mobile device.

An additional exemplary embodiment in accordance with this invention provides a computer readable medium for synchronizing channels on unlicensed bands. The computer readable medium is tangibly encoded with a computer program executable by a processor to perform any one of the methods above.

In an additional exemplary embodiment of the apparatus above, the computer readable medium is a non-transitory computer readable medium (e.g., CD-ROM, RAM, flash memory, etc.).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems such as for example (WLAN, UTRAN, GSM).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., CRC, SINR, etc.) are not intended to be limiting in any respect, as these parameters may be identified by any suitable names. Further, the various names assigned to different channels (e.g., P-BCH, PS-SCH, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   determining, by user equipment, whether a secondary cell carrier (SCC) channel has started to be used by a first network, the SCC channel is a carrier aggregation channel shared with at least one other network;
   determining, in response to determining that the SCC channel has been started to be used by the first network, an off duration $T_{off}$, describing a period since a previous SCC channel ON period, a given channel ON period is a continuous period of use of the given channel by the first network; and
   performing, in response to determining that the off duration is less than a minimum threshold duration $T_{min}$, fine synchronization based on cyclic redundancy check (CRS) tracking on the SCC channel using coarse synchronization parameters of the previous SCC channel ON period.

2. The method of claim 1, further comprising:
   performing, by the user equipment in response to determining that the off duration is less than the minimum threshold duration and that the off duration is greater than a maximum threshold duration $T_{max}$, fine synchronization based on CRS tracking on the SCC channel using the coarse synchronization parameters of the previous SCC channel ON period as modified by re-initialized CRS tracking parameters.

3. The method of claim 1, further comprising:
   performing, by the user equipment in response to determining that the off duration is greater than a maximum threshold duration $T_{max}$, a coarse synchronization based on primary or secondary synchronization channel (PS-SCH) detection on at least two channels having overlapping ON periods, wherein
   the overlapping ON periods are periods when the at least two channels are simultaneously used by the first network and the at least two channels are shared with the at least one other network.

4. The method of claim 3, wherein the at least two channels are members in a downlink synchronization group.

5. The method of claim 3, further comprising:
   receiving, at the user equipment, an indication of a downlink synchronization group via radio resource control (RRC) signaling from the first network.

6. The method of claim 5, wherein the RRC signaling comprises a fast synchronization verification block.

7. The method of claim 3, further comprising:
   performing, by the user equipment in response to determining that the off duration is greater than the maximum threshold duration and that there are no overlapping ON periods, a coarse synchronization based on PS-SCH detection on the SCC channel using a large detection window.

8. The method of claim 3, wherein
   the coarse synchronization based on PS-SCH detection on the SCC channel using a large detector window is a first coarse synchronization, and
   the method further comprises performing, by the user equipment in a subsequent SCC channel ON period, a second coarse synchronization based on PS-SCH detection on the SCC channel using a small detection window.

9. The method of claim 3, further comprising performing, by the user equipment in response to the coarse synchronization providing new coarse synchronization parameters, fine synchronization based on CRS tracking on the SCC channel using the new coarse synchronization parameters.

10. An apparatus, comprising:
a processor; and
a memory including computer program code, the processor configured to execute the computer program code to:
  determine whether a secondary cell carrier (SCC) channel has started to be used by a first network, the SCC channel is a carrier aggregation channel shared with at least one other network;
  determine, in response to determining that the SCC channel has been started to be used by the first network, an off duration $T_{off}$, describing a period since a previous SCC channel ON period, a given channel ON period is a continuous period of use of the given channel by the first network; and
  perform, in response to determining that the off duration is less than a minimum threshold duration $T_{min}$, fine synchronization based on cyclic redundancy check (CRS)tracking on the SCC channel using coarse synchronization parameters of the previous SCC channel ON period.

11. The apparatus of claim 10, wherein the processor is configured to, in response to determining that the off duration is less than the minimum threshold duration and that the off duration is greater than a maximum threshold duration $T_{max}$, perform fine synchronization based on CRS tracking on the SCC channel using the coarse synchronization parameters of the previous SCC channel ON period as modified by re-initialized CRS tracking parameters.

12. The apparatus of claim 10, wherein
the processor is configured to, in response to determining that the off duration is greater than a maximum threshold duration $T_{max}$, perform a coarse synchronization based on primary or secondary synchronization channel (PS-SCH) detection on at least two channels having overlapping ON periods, and
the overlapping ON periods are periods when the at least two channels are simultaneously used by the first network and the at least two channels are shared with the at least one other network.

13. The apparatus of claim 12, wherein the at least two channels are members in a downlink synchronization group.

14. The apparatus of claim 12, wherein the processor is configured to receive an indication of a downlink synchronization group via radio resource control (RRC) signaling from the first network.

15. The apparatus of claim 14, wherein the RRC signaling comprises a fast synchronization verification block.

16. The apparatus of claim 12, wherein the processor is configured to, in response to determining that the off duration is greater than the maximum threshold duration and that there are no overlapping ON periods, perform a coarse synchronization based on PS-SCH detection on the SCC channel using a large detection window.

17. The apparatus of claim 12, wherein
the coarse synchronization based on PS-SCH detection on the SCC channel using a large detector window is a first coarse synchronization, and
the processor is configured to, in a subsequent SCC channel ON period, perform a second coarse synchronization based on PS-SCH detection on the SCC channel using a small detection window.

18. The apparatus of claim 12, wherein the processor is configured to, in response to the coarse synchronization providing new coarse synchronization parameters, perform fine synchronization based on CRS tracking on the SCC channel using the new coarse synchronization parameters.

19. The apparatus of claim 10, wherein the SCC channel is a channel on an unlicensed band for the first network.

20. A non-transitory computer readable medium storing computer executable instructions that, when executed by a processor, cause the processor to perform actions comprising:
  determining whether a secondary cell carrier (SCC) channel has started to be used by a first network, the SCC channel is a carrier aggregation channel shared with at least one other network;
  determining, in response to determining that the SCC channel has been started to be used by the first network, an off duration $T_{off}$, describing a period since a previous SCC channel ON period, a given channel ON period is a continuous period of use of the given channel by the first network; and
  performing, in response to determining that the off duration is less than a minimum threshold duration $T_{min}$, fine synchronization based on cyclic redundancy check (CRS)tracking on the SCC channel using coarse synchronization parameters of the previous SCC channel ON period.

* * * * *